(12) United States Patent
Kinoshita

(10) Patent No.: US 8,142,241 B2
(45) Date of Patent: Mar. 27, 2012

(54) WATER JET PROPULSION WATERCRAFT

(75) Inventor: Yoshimasa Kinoshita, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 233 days.

(21) Appl. No.: 12/618,820

(22) Filed: Nov. 16, 2009

(65) Prior Publication Data

US 2010/0210155 A1  Aug. 19, 2010

(30) Foreign Application Priority Data

Feb. 18, 2009  (JP) ................................. 2009-034717

(51) Int. Cl.
*B63H 21/22* (2006.01)
*B63H 11/00* (2006.01)

(52) U.S. Cl. ................................. 440/1; 440/38; 440/39

(58) Field of Classification Search ................ 440/1, 38, 440/39
See application file for complete search history.

(56) References Cited

U.S. PATENT DOCUMENTS

| | | | | |
|---|---|---|---|---|
| 4,100,877 A | * | 7/1978 | Scott et al. | 440/1 |
| 5,433,634 A | * | 7/1995 | Nakayama et al. | 440/1 |
| 6,565,397 B2 | * | 5/2003 | Nagafusa | 440/87 |
| 7,182,656 B2 | * | 2/2007 | Nanami et al. | 440/1 |
| 2002/0045390 A1 | | 4/2002 | Nagafusa | |

* cited by examiner

*Primary Examiner* — Lars A Olson
*Assistant Examiner* — Andrew Polay
(74) *Attorney, Agent, or Firm* — Keating & Bennett, LLP

(57) ABSTRACT

A water jet propulsion watercraft includes a hull, an engine disposed inside the hull, a jet propulsion device arranged to be driven by a driving force of the engine, a water detection unit arranged to detect whether or not the hull is immersed in water, and a control unit arranged to restrict an engine rotational speed. The jet propulsion device is arranged to jet water rearward from a jet port to thereby apply a propulsive force to the hull. The water detection unit includes a water detection chamber arranged such that water around the hull is introduced when the hull is in water, and a water level sensor arranged to detect a water level inside the water detection chamber. The control unit is arranged to judge whether or not the hull is in water based on an output signal of the water level sensor and to set a maximum rotational speed of the engine to a rotational speed less than an upper limit rotational speed so as to restrict the rotational speed of the engine to not more than the maximum rotational speed when the hull is not in water.

21 Claims, 11 Drawing Sheets

WATER JET PROPULSION WATERCRAFT

BACKGROUND OF THE INVENTION

1. Field of the Invention

The present invention relates to a water jet propulsion watercraft, and more particularly, to a water jet propulsion watercraft arranged such that a hull is propelled by water being jetted rearward by a jet propulsion device driven by a driving force of an engine.

2. Description of the Related Art

A water jet propulsion watercraft is a marine vessel in which a propulsive force is generated by a jet propulsion device. The jet propulsion device is driven, for example, by a driving force of an engine. The jet propulsion device takes in water around a hull and jets the water to the rear of the hull to apply a propulsive force to the hull.

Ordinarily, with the water jet propulsion device, exhaust gas is exhausted into water to suppress engine exhaust noise. Therefore, an exhaust pipe thus has an opening in the water. There is thus a possibility of water entering into the engine via the exhaust pipe. Thus, in a water jet propulsion watercraft, a box-shaped water lock is provided at an intermediate portion of the exhaust pipe. The water lock can retain water that enters from the opening of the exhaust pipe. Entry of water to the engine side of the water lock is thereby suppressed.

With such a water jet propulsion watercraft, when the water jet watercraft is landed after use (after marine vessel running), the water retained in the water lock remains, and this water may have an adverse effect on the engine, etc. A user of the water jet propulsion watercraft thus performs engine revving, that is, so-called racing on land after landed the watercraft after use. The water remaining inside the water lock can thereby be discharged by an exhaust pressure of the engine.

However, unlike when the hull is in water, the jet propulsion device does not receive resistance of the water during racing on land. Thus, in comparison to use on water, an engine rotational speed increases readily. When the engine rotational speed increases excessively, a load is placed on the engine and an excessively loud noise is generated as exhaust noise.

For resolving this problem, there is known a water jet propulsion watercraft that includes a controller that restricts the engine rotational speed to not more than a predetermined rotational speed when it is determined that the hull is not in water (see, for example, U.S. Patent Application Publication No. 2002/0045390 A1).

With the prior art described in U.S. Patent Application Publication No. 2002/0045390 A1, a pressure sensor or a watercraft speed sensor, attached to an outer side of the hull, is used to determine whether or not the hull is in water. More specifically, in a case where the pressure sensor is used, it is determined that the hull is on land when a state where a detection value of the pressure sensor is not more than an atmospheric pressure continues for not less than a predetermined time. In a case where the watercraft speed sensor is used, it is determined that the hull is on land when a state where a detection value of the watercraft speed sensor is not more than a predetermined value continues for not less than a predetermined time.

SUMMARY OF THE INVENTION

The inventors of preferred embodiments of the present invention described and claimed in the present application conducted an extensive study and research regarding a water jet propulsion watercraft, such as the one described above, and in doing so, discovered and first recognized new unique challenges and problems as described in greater detail below.

That is, with the prior art described above, even when the hull is on land, it cannot be recognized that the hull is on land until the predetermined time elapses. Thus, until the predetermined time elapses, the engine rotational speed is not restricted and there is thus a possibility for the engine rotational speed to increase readily when racing on land is performed.

In order to overcome the previously unrecognized and unsolved problems described above, a preferred embodiment of the present invention provides a water jet propulsion watercraft that includes a hull, an engine disposed inside the hull, a jet propulsion device arranged to be driven by a driving force of the engine, a water detection unit arranged to detect whether or not the hull is immersed in water (for example, at least up to a predetermined height position), and a control unit arranged to restrict a rotational speed of the engine. The jet propulsion device is arranged to jet water rearward from a jet port to thereby apply a propulsive force to the hull. The water detection unit includes, a water detection chamber arranged such that water around the hull is introduced when the hull is in water, and a water level sensor arranged to detect a water level inside the water detection chamber. The control unit is arranged to judge whether or not the hull is in water based on an output signal of the water level sensor and to set a maximum rotational speed of the engine to a first rotational speed less than an upper limit rotational speed when the hull is not in water so as to restrict the rotational speed of the engine to not more than the maximum rotational speed.

By this arrangement, water around the hull is introduced into the water detection chamber when the hull is in water. The water level in the water detection chamber is detected by the water level sensor. That is, the water detection chamber and the water level sensor make up the water detection unit that detects whether or not there is water around the hull. The control unit judges whether or not the hull is in water based on the output signal of the water level sensor. Whether or not the hull is immersed in water (whether or not the hull is in water or on land) can thereby be determined by directly detecting the existence of water around the hull. When the hull is on land, water is not introduced into the water detection chamber and the water level sensor detects a low water level because there is no water around the hull. The control unit can thus judge that the hull is on land based on the output signal of the water level sensor. Thus, the hull is on land can be determined immediately at a point in time at which the water level sensor detects the low water level (for example, a state where there is no water in the water detection chamber), even without elapse of a predetermined time. Also, when the control unit determines that the hull is not in water (is on land), it restricts the rotational speed of the engine to not more than the predetermined first rotational speed. The rotational speed of the engine can thereby be restricted reliably to not more than the first rotational speed when performing racing on land. Problems due to the rotational speed of the engine rising too high when performing racing on land can thereby be prevented. That is, an increase in the load on the engine and generation of an excessively loud noise as exhaust noise of the engine during high speed rotation can be prevented.

Preferably in a preferred embodiment of the present invention, the water detection chamber is disposed inside the hull, and a water introduction channel arranged to introduce the water around the hull into the water detection chamber from an exterior of the hull is further included. By this arrangement, when there is water around the hull, the water can be introduced via the water introduction channel into the water detection chamber that is disposed inside the hull. Whether or not the hull is in water can thereby be judged by the water detection unit (the water detection chamber and the water level sensor) disposed inside the hull. Thus, unlike in a case where the water detection unit is disposed at an outer side of the hull, the water detection unit can be prevented from breaking due to the water detection unit hitting an object, etc. Also, with the water jet propulsion watercraft, although water pressure applied to an outer side of the hull varies significantly, an influence due to variation of water pressure applied to the water detection unit can be minimized by disposing the water detection unit inside the hull. The water detection unit can thereby be made to have adequate durability and reliability.

Preferably, the water jet propulsion water craft is arranged such that the water in the water detection chamber is discharged to the exterior of the hull via the drain channel in a transition from a state in which the hull is in water to a state in which the hull is not in water, and the drain channel is disposed below the water detection chamber. By this arrangement, the water introduced into the water detection chamber when the hull is in water can be discharged rapidly via the drain channel, disposed below the water detection chamber, when the hull is on land. The fact that the hull is on land can thereby be detected reliably. The drain channel may be a channel that includes the water introduction channel or may be a channel that differs from the water introduction channel.

Preferably, in this case, a drain slowing unit that is arranged to slow a drain rate of the water drained from the water detection chamber is provided in the drain channel. By this arrangement, even when a water exit of the drain channel is temporarily exposed to air when the water jet propulsion watercraft jumps between waves, etc., the water in the water detection chamber can be prevented from being completely discharged immediately. Erroneous determination of the hull being on land can thereby be prevented when the water exit of the drain channel is temporarily exposed to air. Restriction of the engine rotational speed to not more than the first rotational speed due to such erroneous determination during running of the water jet propulsion watercraft can thus be prevented.

Preferably, the drain channel is connected to the water detection chamber, and the drain slowing unit includes piping having a smaller flow path cross-sectional area than a horizontal cross-sectional area of the water detection chamber. By this arrangement, drainage of water from inside the water detection chamber can be slowed readily because the flow path cross-sectional area of the piping that forms the drain channel is smaller than the horizontal cross sectional area of the water detection chamber (more specifically, the horizontal cross sectional area of a water housing space).

Preferably, a cooling water introduction channel, arranged to introduce water pressurized by the jet propulsion device as cooling water into the engine, is further included, and the water introduction channel is branched from the cooling water introduction channel. By this arrangement, water can be introduced into the water detection chamber by use of the cooling water introduction channel that is arranged to introduce the cooling water into the engine inside the hull. Thus, in comparison to a case of providing the water introduction channel independently of the cooling water introduction channel, simplification of structure can be achieved. Further, the water at the exterior of the hull can be introduced reliably into the water detection chamber because the pressurized water is introduced into the water detection chamber.

Preferably, in this case, the drain channel includes a portion of the water introduction channel and the cooling water introduction channel. By this arrangement, the structure can be simplified because there is no need to provide a separate drain channel besides the water introduction channel and the cooling water introduction channel.

Preferably, an overflow drain channel, arranged to make excess water inside the water detection chamber overflow and be discharged to the exterior of the hull when the hull is in water, is further included.

Preferably, in this case, at least a portion of the overflow drain channel is disposed above a waterline or draft line in a state where the hull is anchored.

A water jet propulsion watercraft according to a preferred embodiment of the present invention further includes a bilge drain channel, arranged to discharge water retained inside the hull to the exterior of the hull, and the overflow drain channel is joined to the bilge drain channel.

Preferably, at least a portion of the bilge drain channel is disposed above the waterline in the state where the hull is anchored, and a ventilation port is provided at a portion of the bilge drain channel disposed above the waterline. By this arrangement, the ventilation port can prevent a siphon phenomenon when an opening portion of the bilge drain channel at an inner side of the hull is below the waterline and the bilge drain channel is filled with water. That is, water at the exterior of the hull can be prevented from flowing in reverse into the hull via the bilge drain channel by the siphon phenomenon. Also, leakage of water from the ventilation port can be prevented because the ventilation port is disposed above the waterline in the state where the hull is anchored.

Preferably, the water level sensor includes a float sensor having a float that is arranged to rise and descend according to the water level inside the water detection chamber. The float sensor has a simple structure, and breakage and erroneous detection can thus be prevented even upon attachment to the water jet propulsion watercraft with which changes in posture and vibration during operation occur frequently. The water level sensor can thereby be made to have adequate durability and reliability.

Preferably, the water detection chamber is disposed so as to be positioned below a height position of the waterline in the state where the hull is anchored. By this arrangement, that the hull is in water can be detected even when the engine is stopped in the state where the hull is anchored. That is, even for example in a case where forcible supplying of water by the jet propulsion device is not being performed, water can be introduced into the water detection chamber reliably. Whether or not the hull is in water can thereby be determined even in a state where the engine is not in operation.

Preferably, a partition plate, arranged to partition an interior of the hull into a front side portion and a rear side portion is provided inside the hull, the engine is disposed at the front side portion of the hull, and the water detection unit is disposed at the rear side portion of the hull. By this arrangement, the partition plate can prevent the heat of the engine from radiating directly onto the water detection unit. The water detection unit is thereby made less likely to be influenced by the heat of the engine, and lowering of detection precision of the water detection unit can be prevented.

Preferably, the control unit is arranged to judge whether or not the hull is in water based on a signal from the water level sensor and to set the maximum rotational speed of the engine to a second rotational speed greater than the first rotational speed when the hull is in water. By this arrangement, operation can be performed by raising the engine rotational speed in an ordinary manner at times other than when performing racing on land.

In a preferred embodiment of the present invention, the water jet propulsion watercraft further includes an inverting member disposed in a manner enabling movement between a forward drive position of not blocking the water jetted from the jet port of the jet propulsion device and a reverse drive position of blocking the water jetted from the jet port. The inverting member is arranged to convert a jetting direction of the water jetted rearward from the jet port to a forward direction at the reverse drive position. Preferably, in this case, the control unit is arranged to set the maximum rotational speed of the engine to the second rotational speed regardless of the signal from the water level sensor when the inverting member is at the reverse drive position. By this arrangement, convenience in setting the water jet propulsion watercraft in water from land can be improved. That is, there is a case where the inverting member is moved to the reverse drive position with the jet propulsion device being placed in water and, while jetting water forward, the water jet propulsion watercraft is backed into water by the propulsive force. In this process, the rotational speed of the engine can be raised to the second rotational speed even when it is judged that the water jet propulsion watercraft is on land based on the signal of the water level sensor. Restriction of the propulsive force for setting the hull in water can thereby be prevented.

Other elements, features, steps, characteristics and advantages of the present invention will become more apparent from the following detailed description of the preferred embodiments with reference to the attached drawings.

DETAILED DESCRIPTION OF THE PREFERRED EMBODIMENTS

An arrangement of a water jet propulsion watercraft 1 according to a preferred embodiment of the present invention shall now be described with reference to FIGS. 1 to 10. In the figures, "FWD" indicates a forward drive direction of the marine vessel, and "BWD" indicates a reverse drive direction of the marine vessel.

Figure 1:
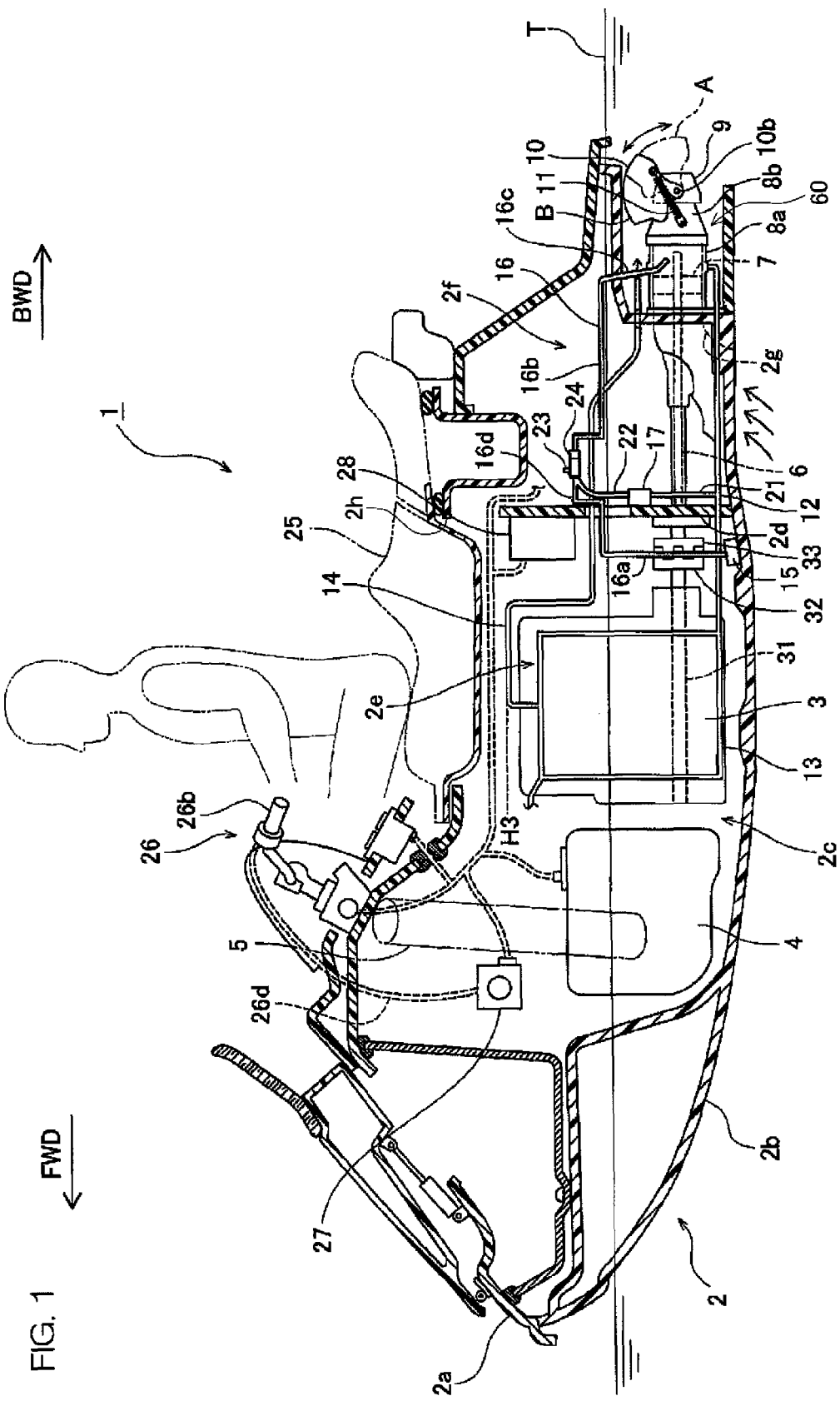
FIG. 1 is a sectional view of an overall arrangement of a water jet propulsion watercraft according to a preferred embodiment of the present invention.

FIG. 1 is a sectional view of an overall arrangement of the water jet propulsion watercraft 1. The water jet propulsion watercraft 1 includes a hull 2 and a jet propulsion device 60. The hull 2 includes a deck 2a and a hull body 2b. The hull 2 is arranged to be immersed up to a predetermined height position in an anchoring state.

An engine room 2c is provided in an interior of the hull 2. The engine room 2c is arranged to house an engine 3, a fuel tank 4, etc. The engine 3 preferably is, for example, a serial four-cylinder engine (internal combustion engine). A bulkhead 2d, extending vertically upward from the hull body 2b, is provided at a rear portion of the interior of the hull 2. The bulkhead 2d partitions the interior of the hull 2 in a front/rear direction to define a front side portion 2e and a rear side portion 2f. The engine 3 is disposed in the front side portion 2e. A water detection unit 17 to be described later is disposed in the rear side portion 2f. The bulkhead 2d further has a function of suppressing the occurrence of rolling which is a phenomenon by which the hull 2 is twisted about a front/rear direction as an axis. The bulkhead 2d is an example of a "partition plate" according to a preferred embodiment of the present invention.

An air ventilation hose 5, extending downward from the deck 2a (upper portion of the hull 2), is provided in the engine room 2c in which the engine 3 is disposed. The air ventilation hose 5 is provided for ventilation of the interior of the engine room 2c.

A seat 25 is provided above the engine 3 at the deck 2a. An opening 2h, enabling access to the engine room 2c, is provided below the seat 25. A steering unit 26 arranged to be operated by a user for steering the hull 2 is disposed in front of the seat 25.

Figure 2:
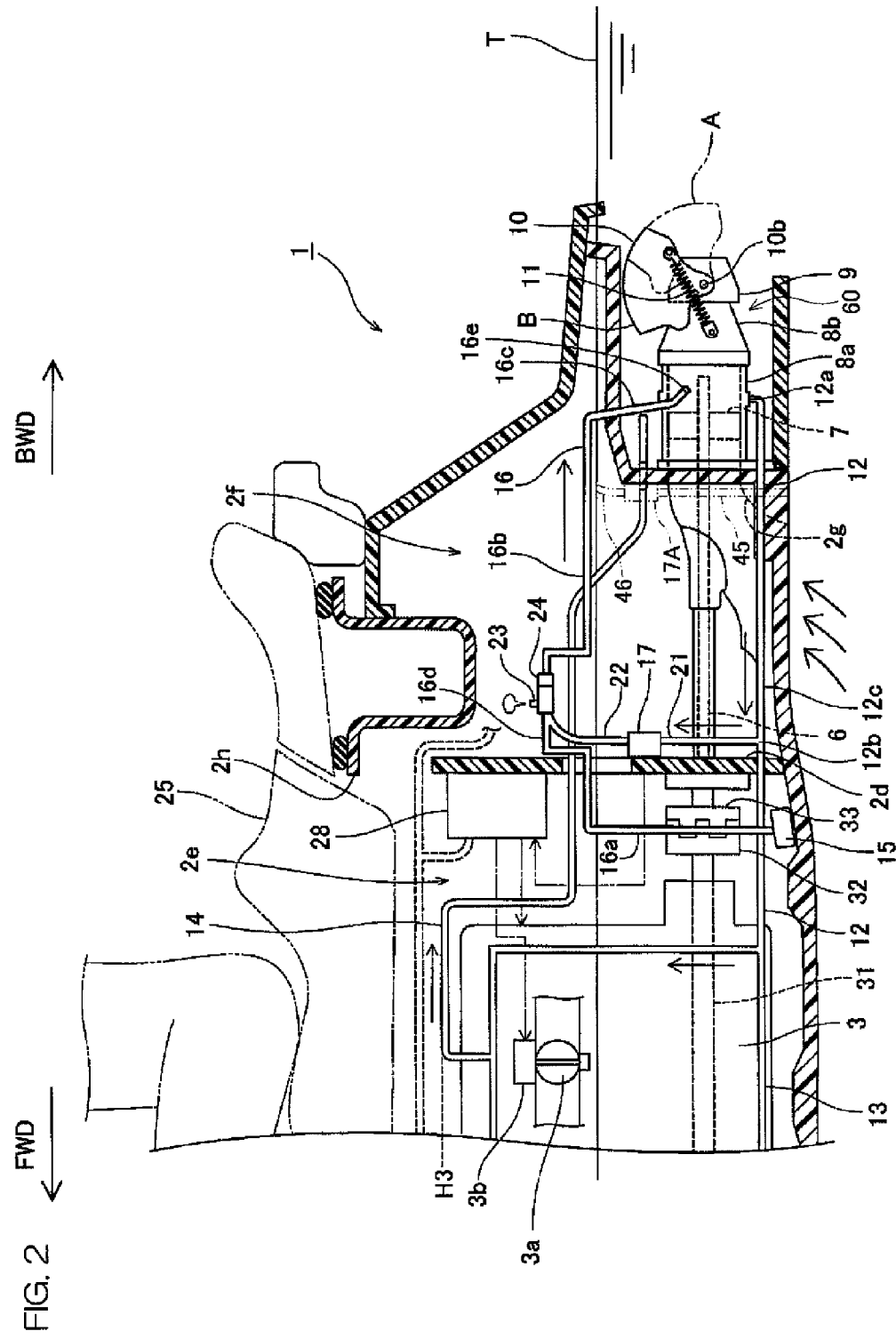
FIG. 2 is an enlarged sectional view for describing in detail an arrangement of an interior of a hull of the water jet propulsion watercraft.

FIG. 2 is a partial sectional view for describing in detail an arrangement of the interior of the hull of the water jet propulsion watercraft 1. The engine 3 has a crankshaft 31 disposed so as to extend in the front/rear direction (FWD arrow direction and BWD arrow direction). The engine 3 is arranged to combust a mixed gas of air and fuel in a combustion chamber (not shown) to thereby generate a driving force that causes the crankshaft 31 to rotate. Specifically, the engine 3 includes a throttle valve 3a, a throttle valve actuator 3b that is arranged to drive the throttle valve 3a, a fuel injection system 3c (see FIG. 10), and an ignition system 3d (see FIG. 10). The throttle valve 3a adjusts an amount of air supplied to the combustion chamber (not shown). The fuel injection system 3c supplies fuel at a predetermined timing. The ignition system 3d ignites the mixed gas inside the combustion chamber at a predetermined timing. The throttle valve actuator 3b, the fuel injection system 3c, the ignition system 3d, etc., are electrically controlled by an ECU (engine control unit) 28. The ECU 28 is attached to an engine room 2c side of an upper portion of the bulkhead 2d. The ECU 28 is an example of a "control unit" according to a preferred embodiment of the present invention.

A pair of couplings 32 and 33 are provided at the rear of the crankshaft 31. The couplings 32 and 33 are arranged to connect the crankshaft 31 and an impeller shaft 6, and have a function of transmitting the rotation of the crankshaft 31 to the impeller shaft 6. The impeller shaft 6 is disposed so as to penetrate through the bulkhead 2d from the engine room 2c and extend rearward. A vicinity of a rear end portion of the impeller shaft 6 is guided into an impeller housing 8a through a water suction portion 2g of the hull 2. The impeller housing 8a is a component of the jet propulsion device 60 that is provided at a rear portion of the hull 2.

The jet propulsion device 60 includes an impeller 7, the impeller housing 8a, a nozzle 8b, and deflector 9. The impeller 7 is attached to the vicinity of the rear end portion of the impeller shaft 6. The impeller 7 is disposed in an interior of the impeller housing 8a that is connected to a rear portion of the water suction portion 2g. The impeller 7 is arranged to suck in water below a water surface from the water suction portion 2g and jet the sucked-in water rearward from the nozzle 8b provided at the rear of the impeller housing 8a. The impeller housing 8a and the nozzle 8b are provided on an outer side of the hull 2 and are arranged to be jetted rearward. The deflector 9, which converts a jet stream of the water jetted rearward from the nozzle 8b to left and right directions, is provided at the rear of the nozzle 8b. The nozzle 8b and the deflector 9 are an example of a "jet port" according to a preferred embodiment of the present invention.

A bucket 10 is provided at the rear of the deflector 9. The bucket 10 is arranged to be movable to the rear of the deflector 9 at the outer side of the hull 2. When the bucket 10 is moved to the rear of the deflector 9, it converts a jetting direction of the water, jetted rearward from the nozzle 8b and the deflector 9, to a forward direction. The bucket 10 may be attached to the deflector 9 or may be attached to the impeller housing 8a. The bucket 10 is an example of an "inverting member" according to a preferred embodiment of the present invention.

As show in FIG. 2, the bucket 10 is attached to the deflector 9 such that the bucket 10 is rotatable about a supporting point 10b. The bucket 10 is rotated about the supporting point 10b by a driving force from an actuator 10a (see FIG. 10). The bucket 10 is attached to the deflector 9 such that the bucket 10 is rotatable between a reverse drive position A (indicated by phantom lines) at the rear of the deflector 9 and a forward drive position B (indicated by solid lines) at which it is retreated to an upward direction from the rear of the deflector 9. The forward drive position B is a position at which the water jetted rearward from the nozzle 8b is not blocked by the bucket 10. Meanwhile, the reverse drive position A is a position at which the water jetted rearward from the nozzle 8b is blocked by the bucket 10.

When the bucket 10 is positioned at the reverse drive position A, water is jetted rearward toward the bucket 10 from the deflector 9 and the rearward jetted water hits the bucket 10. A moving direction of at least a portion of the jetted water is thereby converted to the forward direction. That is, the water stream that hits the bucket 10 is converted into a water stream that is directed not just simply forward but diagonally forward in plan view or diagonally forward in side view or another direction that includes at least a forward directed vector. The hull 2 can thereby be decelerated or propelled rearward. Meanwhile, when the bucket 10 is positioned at the forward drive position B, the rearward jetted water is jetted rearward without hitting the bucket 10. The hull 2 can thus be propelled forward.

As shown in FIG. 2, one end of a spring member 11, preferably made of a compression coil spring, is attached to the bucket 10. The other end of the spring member 11 is attached to an outer side surface of the impeller housing 8a. The spring member 11 has a function of holding the bucket 10 at the forward drive position B that is retreated from the rear of the deflector 9. That is, ordinarily, the bucket 10 is held at the forward drive position B by an urging force of the spring member 11 and the hull 2 is thereby held in a state of moving forward. To make the hull 2 move in reverse, the actuator 10a (see FIG. 10) is driven. A force that rotates the bucket 10 downward about the supporting point 10b against the spring force of the spring member 11 is thereby applied to the bucket 10. The bucket 10 can thereby be moved to the reverse drive position A. The hull 2 can thereby be moved in reverse.

Figure 3:
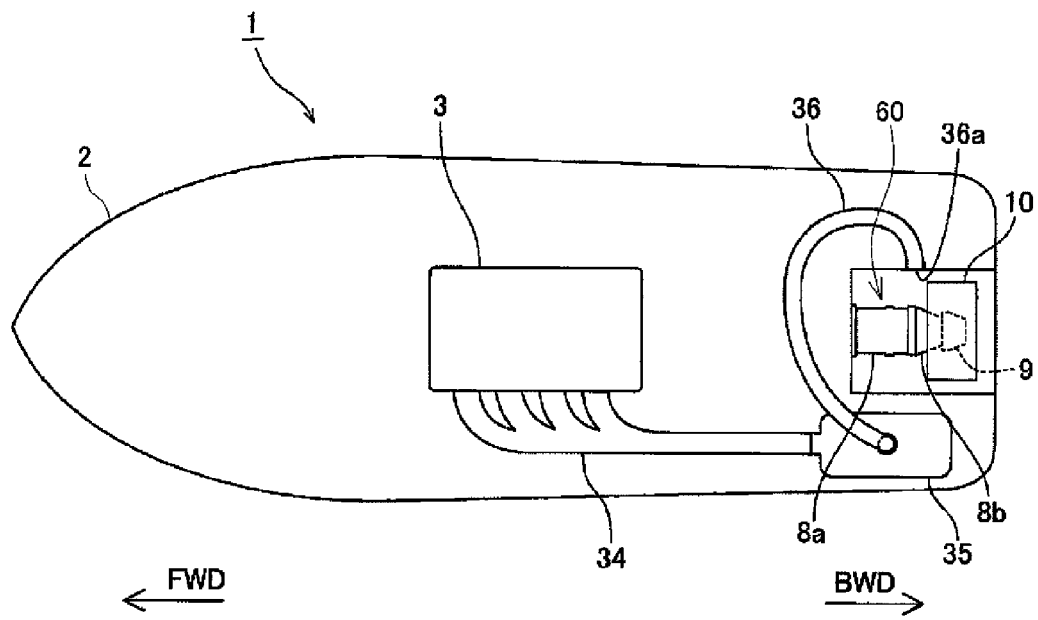
FIG. 3 is schematic plan view for describing the arrangement of the interior of the hull of the water jet propulsion watercraft.

FIG. 3 is a schematic plan view for describing the arrangement of the interior of the hull 2 of the water jet propulsion watercraft 1. The engine 3 is provided with a first exhaust pipe 34 that extends rearward from a side surface of the engine 3. The first exhaust pipe 34 is connected to a second exhaust pipe 36 via a water lock 35 that prevents reverse flow of water. An exhaust port 36a, located at an exit end of the second exhaust pipe 36, is introduced into water. Exhaust gas of the engine 3 is thereby arranged to be exhausted into the water.

Figure 4:
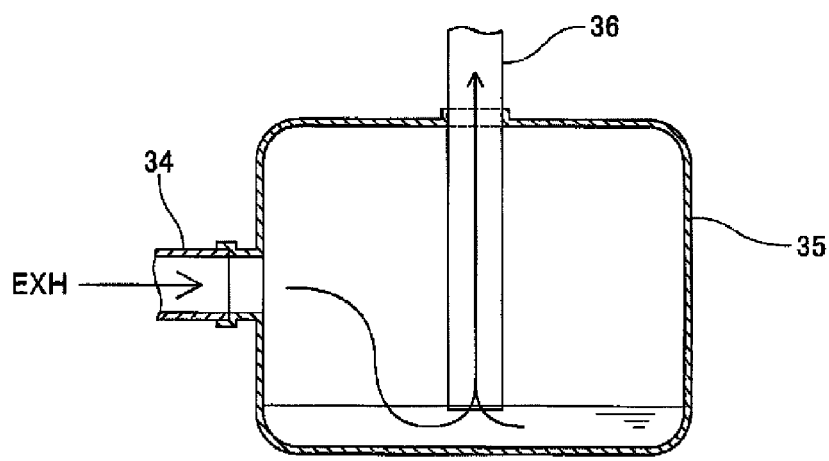
FIG. 4 is a sectional view for describing a structure of a water lock of the water jet propulsion watercraft.

FIG. 4 is a sectional view for describing a structure of the water lock 35. The water lock 35 preferably has a hollow, box-shaped body. The water lock 35 retains water, entering from the exhaust port 36a of the second exhaust pipe 36, in a bottom portion thereof to prevent entry of the water into the first exhaust pipe 34. The second exhaust pipe 36 and the water lock 35 are connected by an entrance end of the second exhaust pipe 36 being inserted from an upper portion of the water lock 35. An exit end of the first exhaust pipe 34 is coupled to a side wall of the water lock 35. The coupling position is a position of predetermined height from an inner bottom surface of the water lock 35. A structure with which the water retained inside the water lock 35 is unlikely to enter the first exhaust pipe 34 is thereby realized.

As shown in FIG. 1 and FIG. 2, in the water jet propulsion watercraft 1, the engine 3 is arranged to be cooled using seawater as cooling water. Specifically, a cooling water introduction channel 12 is provided. The cooling water introduction channel 12 is preferably defined by piping arranged to introduce seawater from a lower portion of the impeller housing 8a and extends to the engine 3 inside the hull 2. That is, an entrance end of the cooling water introduction channel 12 is coupled to a lower portion of the impeller housing 8a. The cooling water introduction channel 12 extends along a lower portion of the hull 2. An exit end of the cooling water introduction channel 12 is connected to a cooling water entrance of a water jacket 13 that cools the engine 3. A cooling water exit of the water jacket 13 is connected to a cooling water drain channel 14 also preferably defined by piping. Water that has absorbed a heat of the engine 3 is thereby guided from the cooling water exit to the cooling water drain channel 14. The cooling water drain channel 14 extends rearward from the engine 3 to a vicinity of the jet propulsion device 60. An exit of the cooling water drain channel 14 is disposed outside the hull 2 above the impeller housing 8a. When the impeller 7 is driven by the engine 3, water is pressurized in the impeller housing 8a by the action of the impeller 7. A portion of the pressurized water is introduced into the cooling water introduction channel 12 and is supplied to the water jacket 13 as the cooling water. The water that has absorbed the heat of the engine 3 is discharged outside the hull 2 through the cooling water drain channel 14.

The water jet propulsion watercraft 1 further includes a bilge system arranged to discharge water retained inside the hull 2. Specifically, the bilge system includes a suction port 15 and a bilge drain channel 16. The suction port 15 is disposed at a bottom portion of the engine room 2c. The bilge drain channel 16, preferably defined by piping, is connected to the suction port 15. The bilge drain channel 16 extends to a rear side portion 2f of the hull 2 through an opening formed in the bulkhead 2d. An exit end of the bilge drain channel 16 is arranged to discharge water into the impeller housing 8a. The bilge drain channel 16 has a first portion 16a, a second portion 16b, and a third portion 16c. The first portion 16a extends from the suction port 15 to above a waterline T. The second portion 16b is connected to the first portion 16a and extends in a horizontal direction in a region above the waterline T. The third portion 16c is connected to the second portion 16b and is introduced into the impeller housing 8a. The second portion 16b has a connection portion 16d that is connected to an overflow drain channel 22 to be described later. The connection portion 16d extends in a horizontal direction and is disposed further above the other portions of the second portion 16b. A tip portion 16e (exit end) of the third portion 16c is disposed inside the impeller housing 8a, extends in a direction along the flow direction of the jet flow caused by the impeller 7 and opens toward a downstream side of the flow direction. A negative pressure is thereby generated at the tip portion 16e of the third portion 16c. Using this negative pressure, the water retained in the bottom portion of the hull 2 can be discharged to the exterior of the hull 2 via the bilge drain channel 16.

In the present preferred embodiment, the water detection unit 17 arranged to determine whether or not the hull 2 is in water is preferably provided in the interior of the hull 2.

The water detection unit 17 is connected to a water introduction channel 21 preferably defined by piping that branches upward from an intermediate portion of the cooling water introduction channel 12. Also, the water detection unit 17 is connected to the overflow drain channel 22 preferably defined by piping. The overflow drain channel 22 is joined to the bilge drain channel 16. Thus, when seawater, pressurized by the jet propulsion device 60, is introduced into the water jacket 13 via the cooling water introduction channel 12, the seawater is branched to the water introduction channel 21 and is introduced into the water detection unit 17 as well. The water that has been introduced into the water detection unit 17 fills the water detection unit 17 and is thereafter joined to the bilge drain channel 16 from the overflow drain channel 22 and drained.

Figure 5:
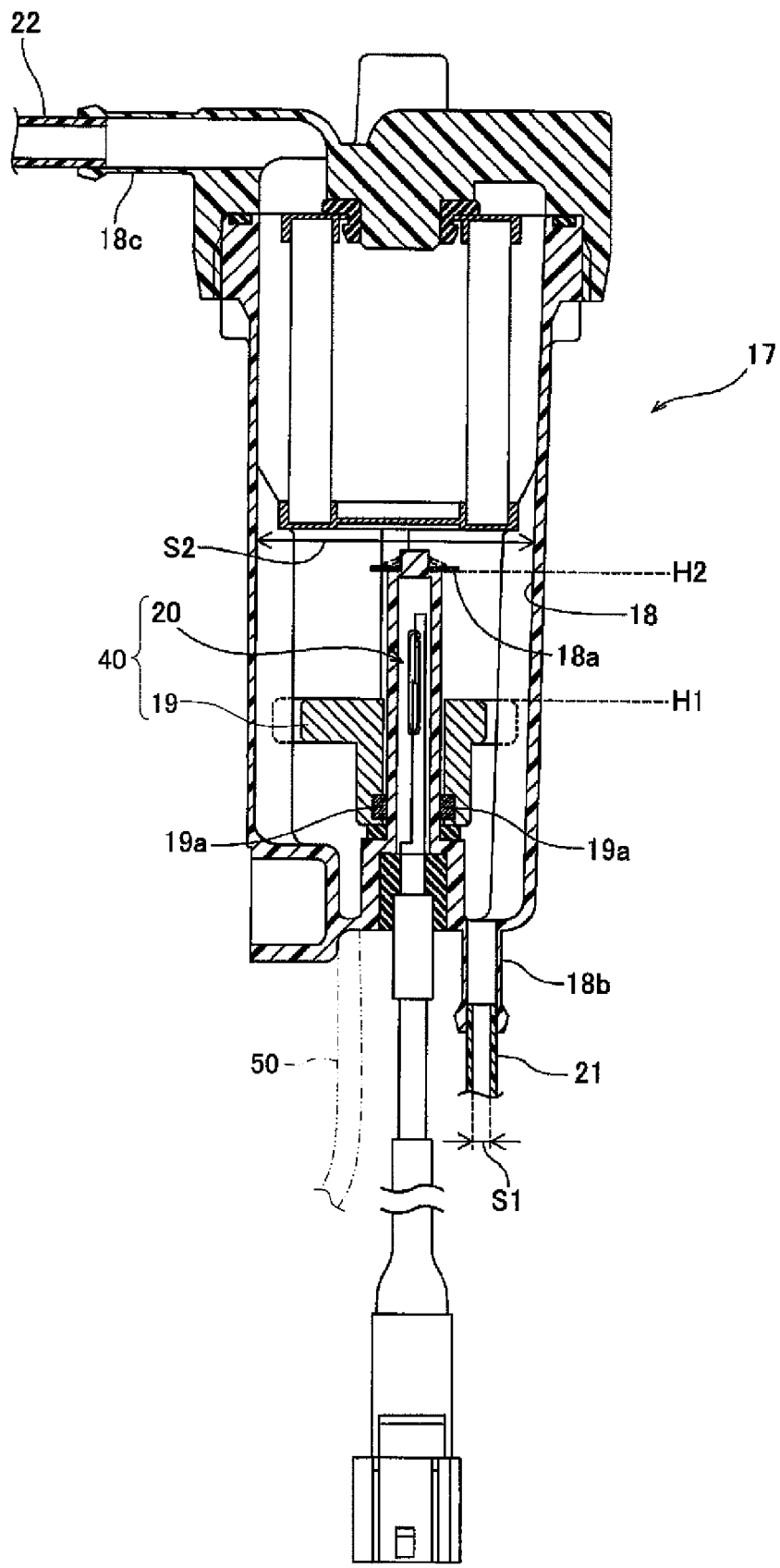
FIG. 5 is a sectional view of an OFF state of a structure of a water detection unit of the water jet propulsion watercraft.
Figure 6:
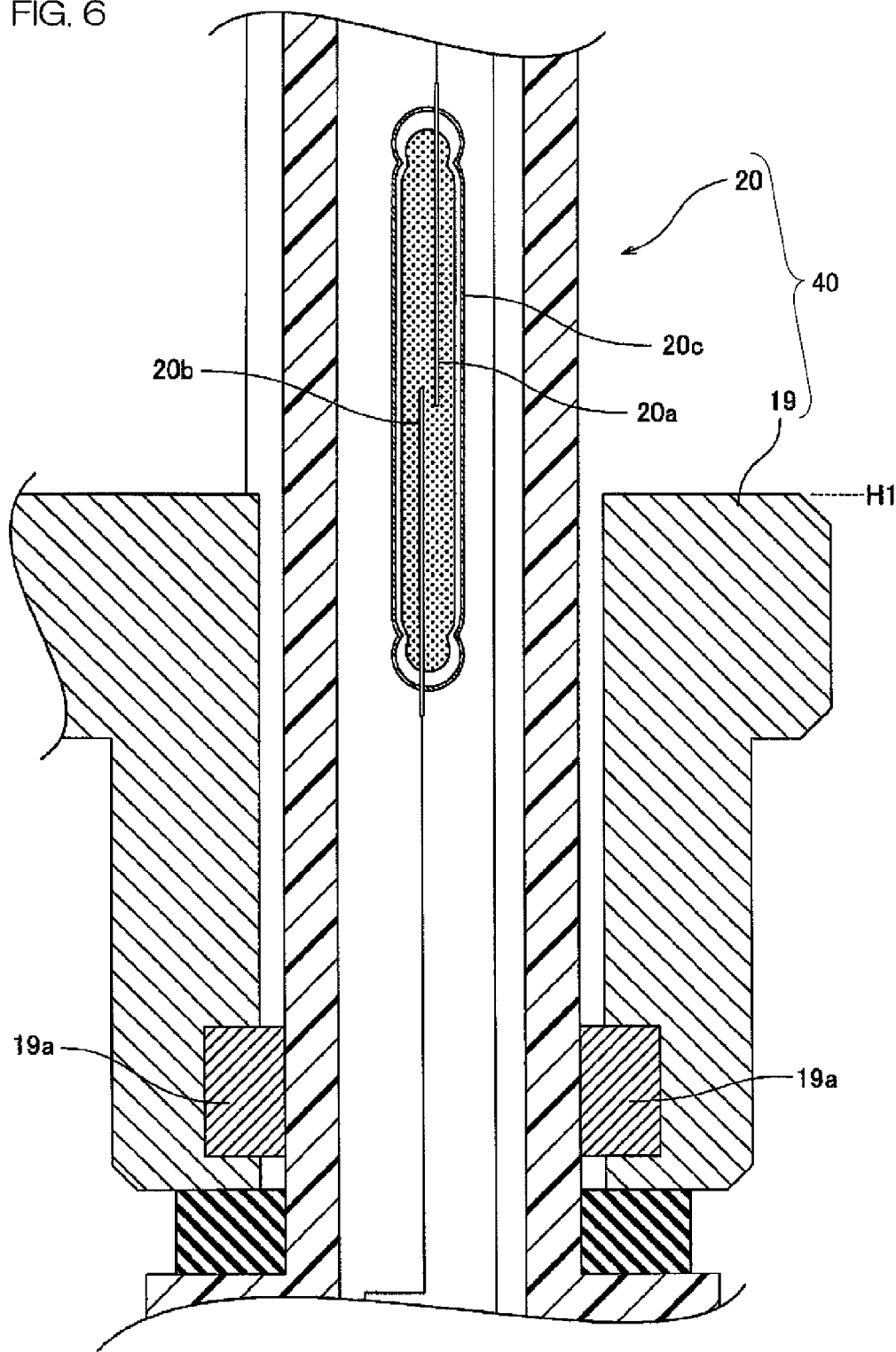
FIG. 6 is an enlarged view of the water detection unit shown in FIG. 5.
Figure 7:
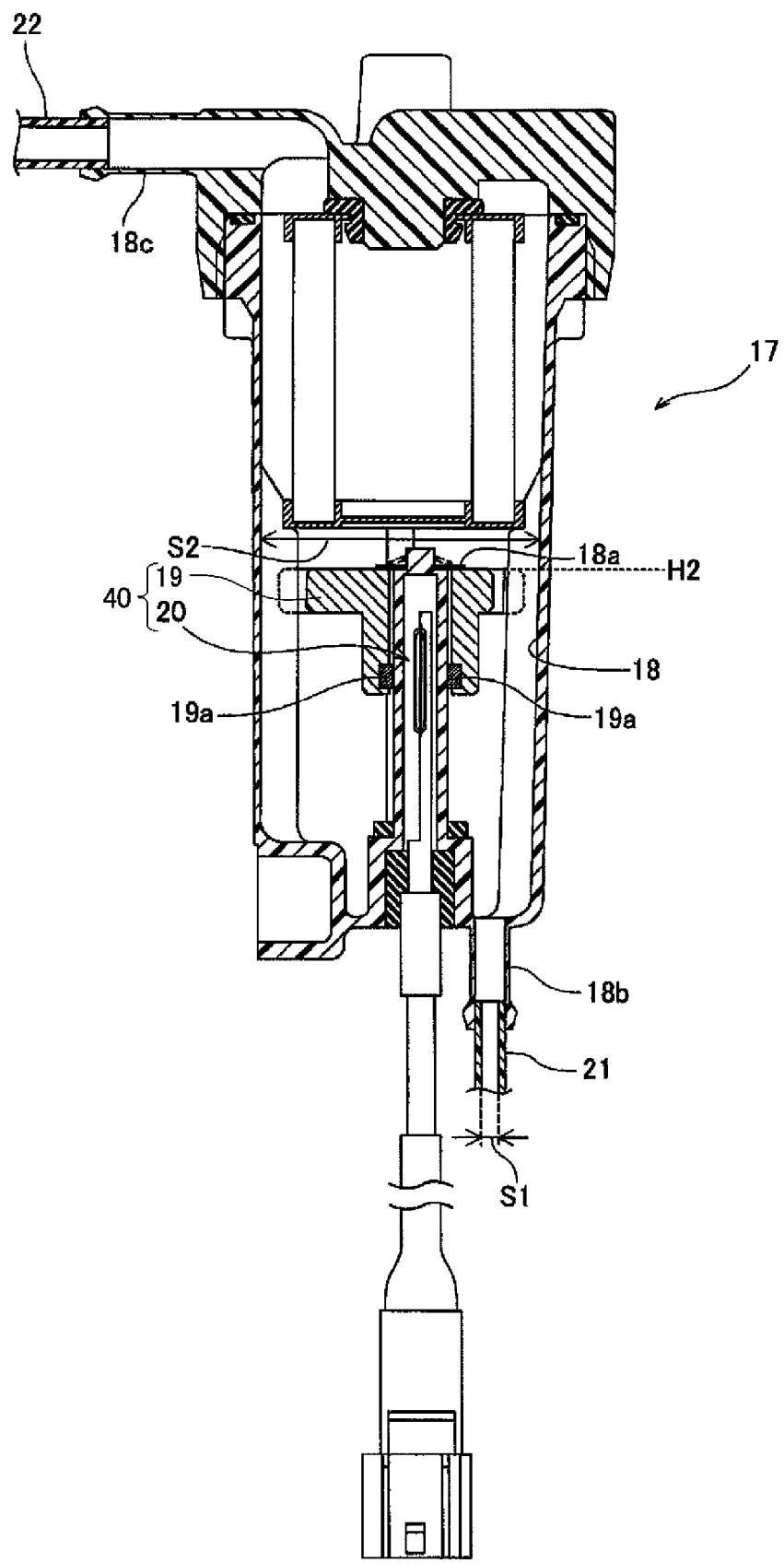
FIG. 7 is a sectional view of an ON state of the structure of the water detection unit.
Figure 8:
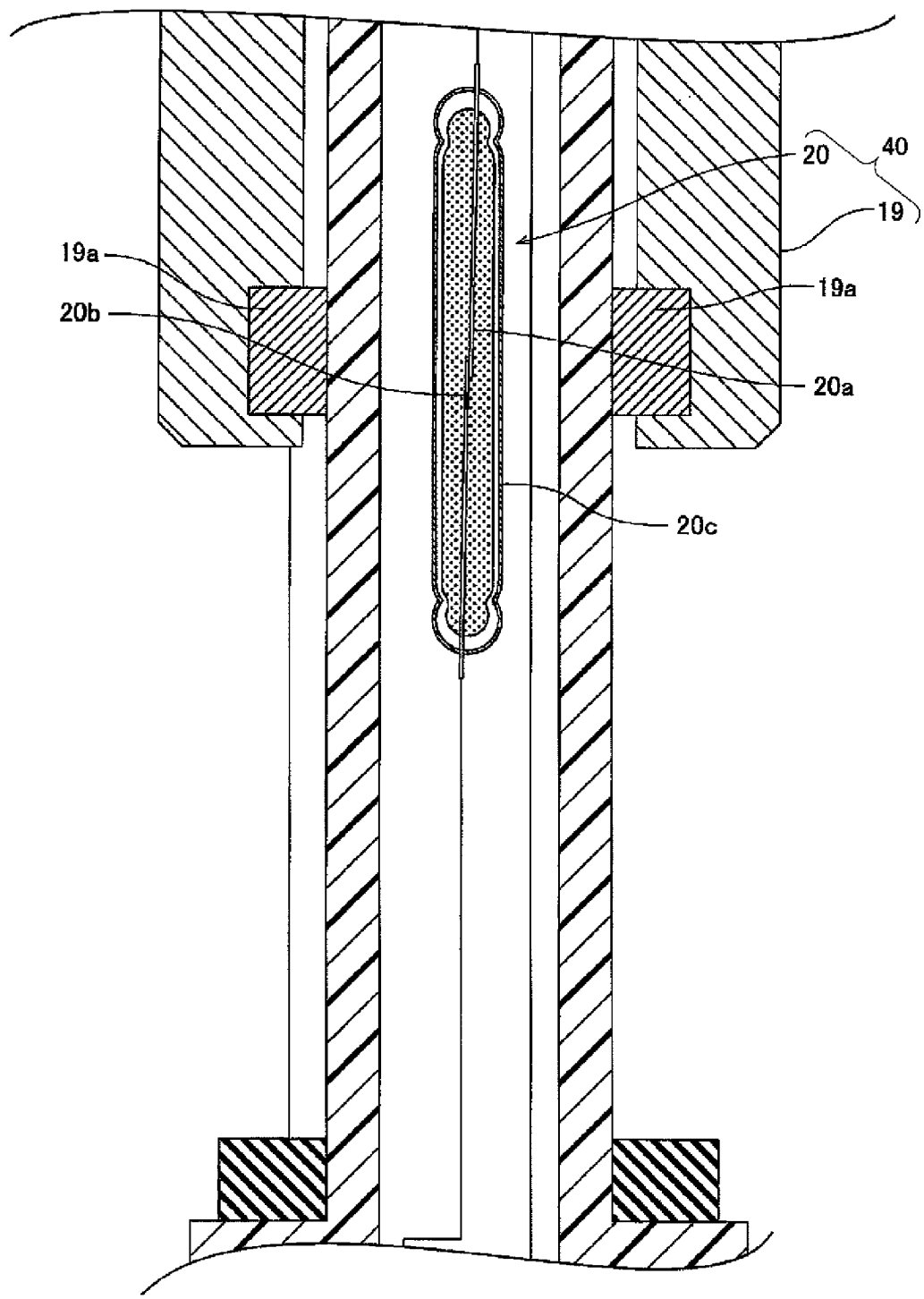
FIG. 8 is an enlarged view of the water detection unit shown in FIG. 7.

FIG. 5 and FIG. 7 are sectional views of a structure of the water detection unit 17, with FIG. 5 showing a state where the water detection unit 17 is not detecting water (OFF state) and FIG. 7 showing a state where the water detection unit 17 is detecting water (ON state). FIG. 6 and FIG. 8 are partially enlarged sectional views of the arrangements of FIG. 5 and FIG. 7, respectively.

The water detection unit 17 includes a housing 18 as a water detection chamber and a water level sensor 40 provided inside the housing 18. The water level sensor 40 preferably is in a form of a float sensor and includes a float 19 and a switch portion 20. The float 19 is attached inside the housing 18 in a manner enabling rising and descending. The housing 18 has, for example, a substantially cylindrical tubular body. The switch portion 20 has two lead terminals 20a and 20b which are disposed such that tip portions thereof oppose each other. When there is no water inside the housing 18, the float 19 is positioned by gravity at a height position H1 (see FIG. 5), which is a lowest point. The float 19 is arranged such that when water is introduced into the housing 18, it rises by buoyancy due to water in accordance with a water level inside the housing 18. The float 19 is arranged such that when the water level inside the housing 18 is not lower than a predetermined height position, the float 19 is stopped at a height position H2 (see FIG. 7), which is an uppermost point, by an upper surface of the float 19 contacting a stopper 18a.

A permanent magnet 19a is attached to the float 19. The permanent magnet 19a is attached to the float 19 so as to be positioned at the same height position as the lead terminals 20a and 20b of the switch portion 20 when the float 19 is positioned at the height position H2. The two lead terminals 20a and 20b are arranged such that the mutual tips are normally separated inside a glass tube 20c, filled with an inert gas. When the tips of the two lead terminals 20a and 20b contact each other, a current flows through the switch portion (the switch portion 20 is put in the ON state).

When the float 19 is not raised to the height position H2, the tip portions of the two lead terminals 20a and 20b are maintained in the separated state (OFF state). When the float 19 rises to the height position H2, the lead terminals 20a and 20b are temporarily magnetized by the permanent magnet 19a and the tip portions of the lead terminals 20a and 20b contact each other (ON state). The water level sensor 60 is thus arranged to defect that the water level inside the housing 18 is not lower than the predetermined height position.

A lower portion 18b of the housing 18 is connected to the water introduction channel 21 branched from the cooling water introduction channel 12. Thus, when the seawater pressurized by the jet propulsion device 60 is introduced into the water jacket 13 via the cooling water introduction passage 12, the seawater is also branched to the water introduction channel 21 and introduced into the housing 18. An upper portion 18c of the housing 18 is connected to the overflow drain channel 22 made of piping and joined to the bilge drain channel 16. The water introduced into the housing 18 from the water introduction passage 21 fills the housing 18. Thereafter, when water is supplied further from the water introduction channel 21, the excess water overflows and is drained to the overflow drain channel 22 from the housing 18.

When the engine 3 of the water jet propulsion watercraft 1 is driven and there is water around the jet propulsion device 60 (when the hull 2 is in water), pressurized water passes through the cooling water introduction channel 12, the water introduction channel 21, the housing 18, the overflow drain channel 22, and the bilge drain channel 16. The interior of the housing 18 is thus filled with water.

The housing 18 and the overflow drain channel 22 are disposed at positions lower than a height position H3 (see FIG. 2) of an uppermost portion of the water jacket 13 and the cooling water drain channel 14. Thus, when water is introduced from the cooling water introduction channel 12 at the pressure at which the water is circulated through the water jacket 13 and the cooling water drain channel 14, the water can also be circulated through the housing 18 and the overflow drain channel 22 as well.

Also, the housing 18 is disposed so as to be positioned below the waterline T in a state where the water jet propulsion watercraft 1 is anchored on water. Thus, even in a case where the engine 3 is not driven and water is not introduced actively into the housing 18 by the pressure generated by the jet propulsion device 60, the interior of the housing 18 is filled with water as long as the hull 2 is in water. That is, the water around the hull 2 enters from the cooling water introduction channel 12, reaches the housing 18 via the water introduction channel 21, and fills the interior of the housing 18.

In a transition from the state where the hull 2 is in water to the state where the hull 2 is not in water, the water inside the housing 18 is discharged. That is, the water inside the housing 18 is discharged via a portion of the cooling water introduction channel 12 (a channel portion 12c from an introduction port 12a of the cooling water introduction channel 12 to a branching point 12b to the water introduction channel 21 (see FIG. 2)) and the water introduction channel 21. The channel portion 12c of the cooling water introduction channel 12 and the water introduction channel 21 are positioned below the housing 18. Thus, in the transition from the state where the hull 2 is in water to the state where the hull 2 is not in water, the water inside the housing 18 flows into the water introduction channel 21 due to gravity and is further discharged outside the hull 2 through the channel portion 12c of the cooling water introduction channel 12.

As shown in FIG. 5, a diameter of the water introduction channel 21 (a flow path cross-sectional area S1 of the water introduction channel 21) is smaller than a diameter of the housing 18 (horizontal cross-sectional area S2 of the housing 18). Thus, when the water inside the housing 18 is discharged via the water introduction channel 21, the drainage is slowed. Therefore, even in a case where the introduction port 12a (which becomes an exit during draining) of the cooling water introduction channel 12 is temporarily exposed to air during running of the water jet propulsion watercraft 1, water remains inside the housing 18 in the meantime. The water level sensor 40 is thus maintained in the ON state even when the introduction port 12a of the cooling water introduction channel 12 is temporarily exposed to air. The channel portion 12c of the cooling water introduction channel 12 and the water introduction channel 21 are an example of a "drain channel" according to a preferred embodiment of the present invention. Also, the water introduction channel 21 having the smaller diameter than the diameter of the housing 18 is an example of a "drain slowing unit" according to a preferred embodiment of the present invention.

Referring again to FIG. 2, the bilge drain channel 16 has a portion (connection portion 16d) that extends substantially horizontally further above the second portion 16b. The overflow drain channel 22, connected to the housing 18, is joined to the bilge drain channel 16 at the connection portion 16d. Near the junction of the overflow drain channel 22 and the bilge drain channel 16, an upwardly protruding ventilation port 23 is provided at a downstream side of the junction. The ventilation port 23 prevents entry of water due to a siphon phenomenon. That is, if the ventilation port 23 does not exist, the siphon phenomenon may occur when the driving of the engine 3 is stopped in a state where the cooling water introduction channel 12, the water introduction channel 21, the housing 18, the bilge drain channel 16, the overflow drain channel 22, etc., are filled with water. Water may thereby flow in reverse from the bilge drain channel 16 toward the suction port 15 and enter into the engine room 2c. The ventilation port 23 opens such a reverse flow channel of water to the atmosphere to prevent the siphon phenomenon. Also, in the bilge drain channel 16, a check valve 24 is disposed at the third portion 16c side of the ventilation port 23. The check valve 24 prevents water from flowing in the direction of the suction port 15 from the bilge drain channel 16. The ventilation port 23 and the check valve 24 are preferably integral and define a single unit that is incorporated in the bilge drain channel 16.

Figure 9:
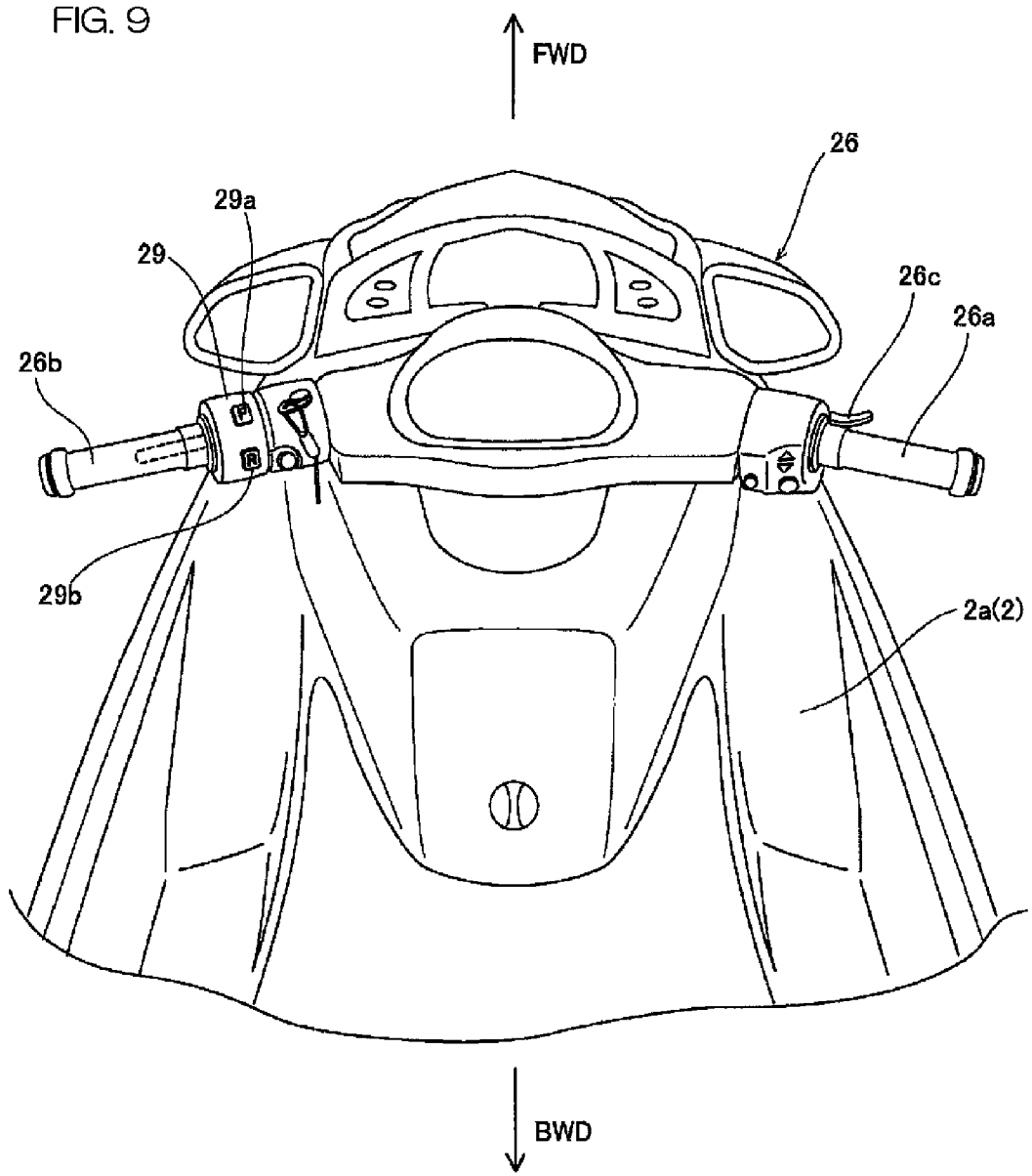
FIG. 9 is a perspective view for describing an arrangement of a vicinity of a steering of the water jet propulsion watercraft.

FIG. 9 is a perspective view for describing an arrangement of a vicinity of the steering unit 26. The steering unit 26 has a right grip 26a and a left grip 26 that are held by a rider to perform steering. An accelerator lever 26c is provided in a rotatable manner on the right grip 26a. Also, as shown in FIG. 1, a throttle wire 26d is connected to the accelerator lever 26c of the right grip 26a. The throttle wire 26d is connected to an accelerator position sensor 27 provided in the interior of the hull 2. The accelerator position sensor 27 has a function of detecting a movement amount of the throttle wire 26d. The accelerator position sensor 27 is arranged to be capable of transmitting an electrical signal, expressing the detected movement amount of the throttle wire 26d, to the ECU 28 (see FIG. 1, FIG. 2, and FIG. 10) via wiring.

A switch case 29, having an outer peripheral surface of cylindrical shape, is provided near a base portion of the left grip 26b. A forward drive switch (F switch) 29a, arranged to be operated by the rider to position the bucket 10 at the forward drive position B (see FIG. 2), is provided in the switch case 29. A reverse drive switch (R switch) 29b, arranged to be operated by the rider to position the bucket 10 at the reverse drive position A (see FIG. 2), is provided near the forward drive switch 29a. A signal generated when the forward drive switch 29a or the reverse drive switch 29b is operated or pressed is transmitted to the ECU 28. Although unillustrated, an engine starting button is also provided in the switch case 29. When the engine starting button is operated or pressed, the ECU 28 is started and the engine 3 is started.

Figure 10:
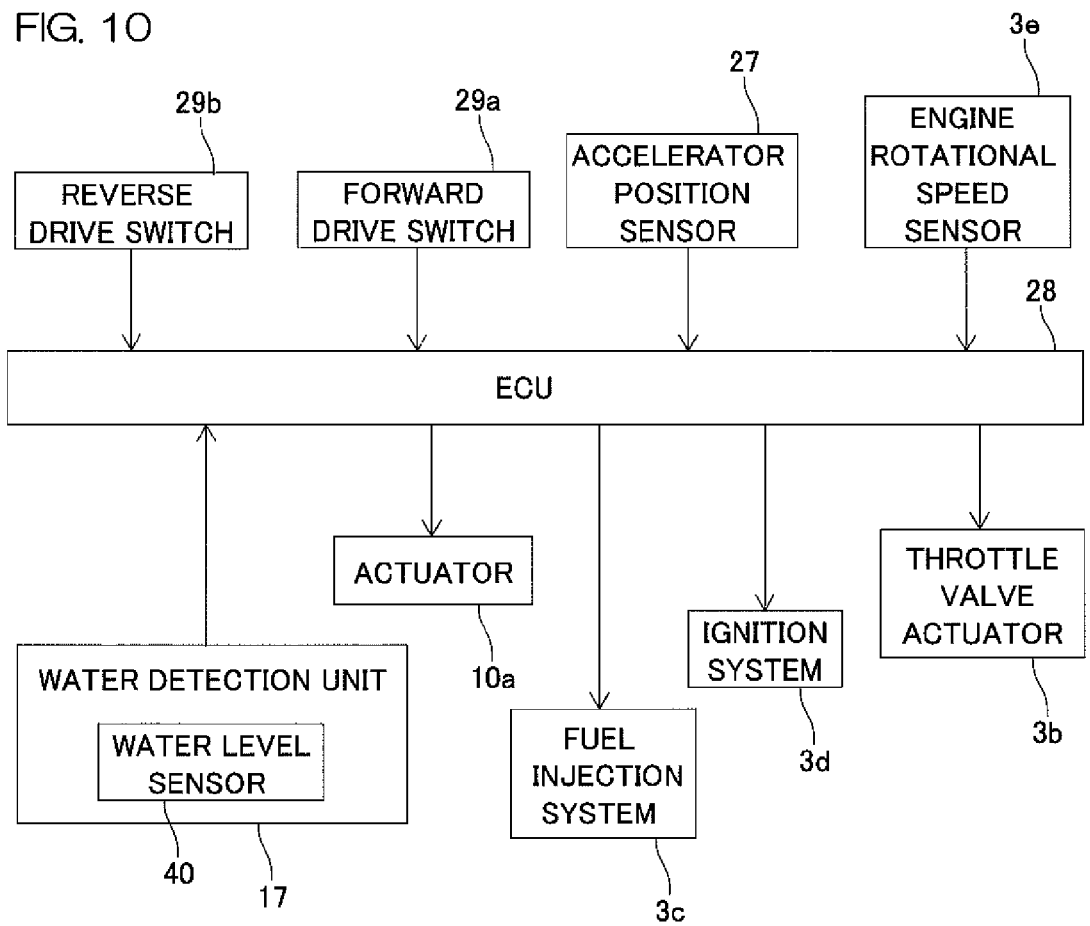
FIG. 10 is a control block diagram of the water jet propulsion watercraft.

FIG. 10 is a control block diagram of the water jet propulsion watercraft 1. The ECU 28 is electrically connected via wiring to respective portions of the water jet propulsion watercraft 1 and has a function of electrically controlling the respective portions of the water jet propulsion watercraft 1. That is, the acceleration position sensor 27, the forward drive switch 29a, the reverse drive switch 29b, the water level sensor 40, the actuator 10a, the throttle valve actuator 3b, the ignition system 3d, the fuel injection system 3c, etc., are connected to the ECU 28. More specifically, the ECU 28 is programmed to control the throttle valve actuator 3b, the ignition system 3d, and the fuel injection system 3c based on the signal from the accelerator position sensor 27. The ECU 28 is thereby arranged to control a rotational speed of the engine 3. Further, the ECU 28 is arranged to control the actuator 10a, which drives the bucket 10, based on the signals from the forward drive switch 29a and the reverse drive switch 29b operated by the rider.

The ECU 28 is further arranged to control a maximum rotational speed of the engine 3 based on the detection result of the water level sensor 40. The engine rotational speed is detected by a signal from an engine rotational speed sensor 3e that detects a rotational speed of the crankshaft 31. Specifically, the ECU 28 sets the maximum rotational speed based on the detection result of the water level sensor 40 and restricts the rotational speed of the engine 3 to not more than the set maximum rotational speed.

The ECU 28 is programmed to judge whether or not the hull 2 is in water based on the detection result of the water level sensor 40. More specifically, the water level sensor 40 outputs a water detection signal when the switch portion 20 (see FIGS. 5 to 8) is in the ON state and does not output the water detection signal when the switch portion 20 is in the OFF state.

The ECU 28 is programmed to set the maximum rotational speed of the engine 3 to a predetermined first rotational speed (for example, approximately 4,000 rpm), which is less than an upper limit rotational speed (for example, approximately 8,000 rpm), when the water detection signal is not input and it is thus determined that the hull 2 is not in water. The ECU 28 is also programmed to set the maximum rotational speed of the engine 3 to a predetermined second rotational speed (for example, approximately 8,000 rpm) when the water detection signal is input and it is thus determined that the hull 2 is in water. The second rotational speed may be set equal to the upper limit rotational speed of the engine 3.

Figure 11:
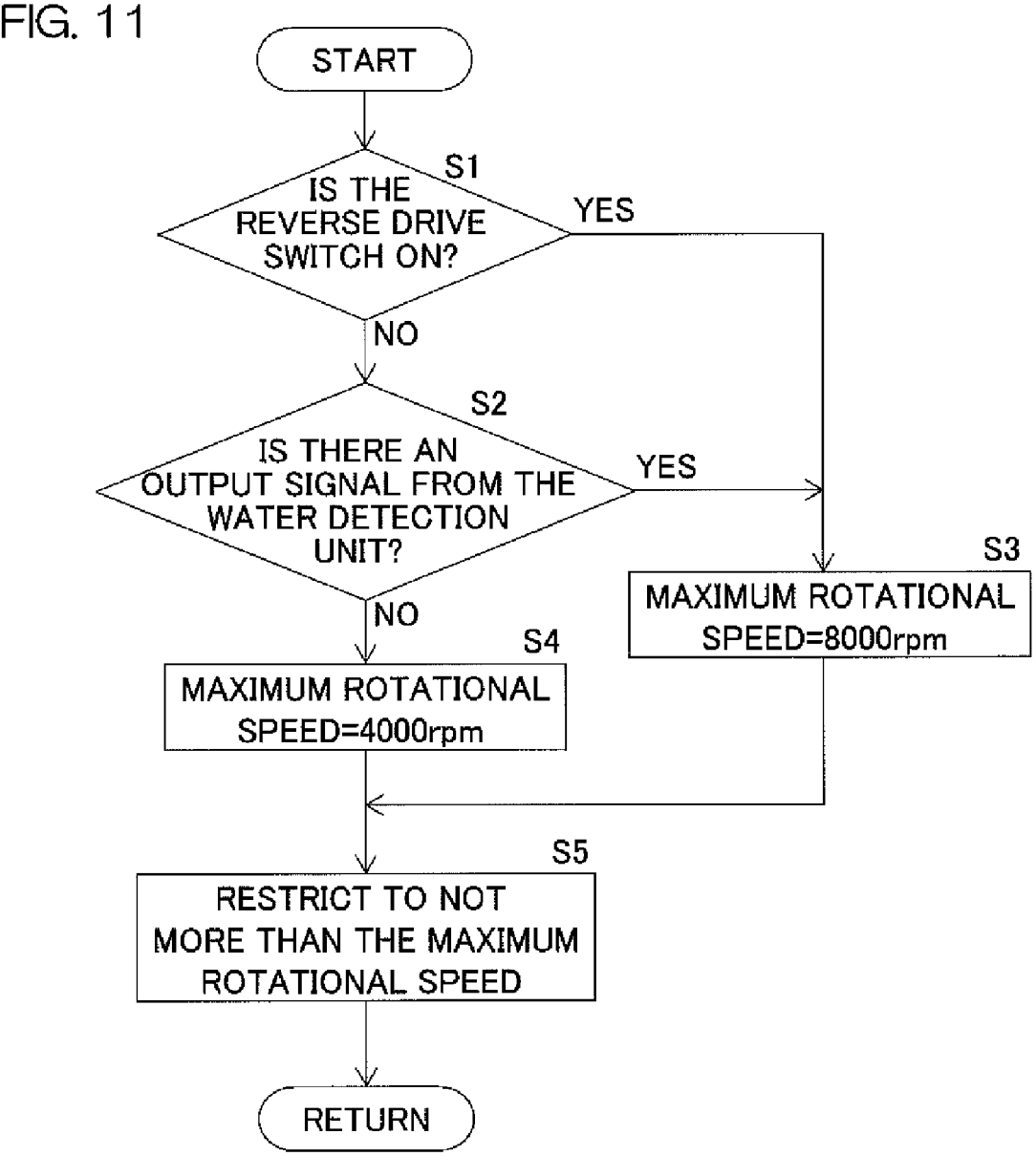
FIG. 11 is a flowchart for describing control of a maximum rotational speed of an engine of the water jet propulsion watercraft.

FIG. 11 is a flowchart for describing the control of the maximum rotational speed of the engine 3. The process that is repeated by the ECU 28 at every predetermined control cycle is shown. When the ECU 28 is started, the ECU 28 determines whether or not the bucket 10 is at the reverse drive position A (step S1). Specifically, the ECU 28 determines whether the reverse drive switch 29b is ON or the forward drive switch 29a is ON. If the bucket 10 is at the reverse drive position, the ECU 28 sets the maximum rotational speed of the engine 3 to the second rotational speed (approximately 8,000 rpm) regardless of whether or not the water detection signal is received (step S3).

Figure 12:
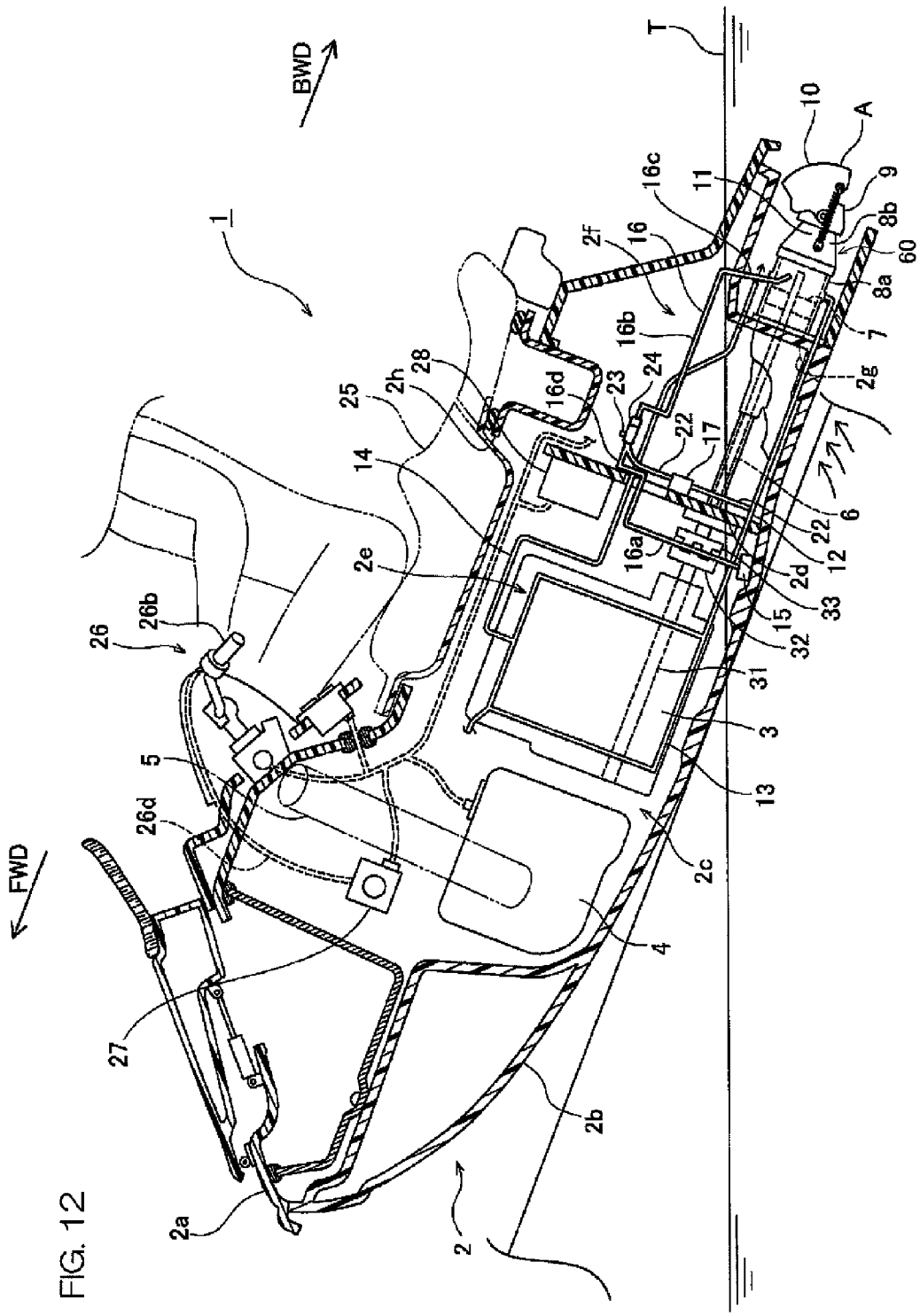
FIG. 12 is a sectional view of a state where the water jet propulsion watercraft is about to be set in water.

FIG. 12 shows an example of a situation where the water jet propulsion watercraft 1 is about to be set in water from land. In the state where the jet propulsion device 60 is placed in water, the rider positions the bucket 10 at the reverse drive position A and operates the accelerator lever 26c. The rider thereby attempts to move the hull 2 into water using the propulsive force by the jet flow. In such a case, the ECU 28 does not restrict the rotational speed of the engine 3. That is in a situation such as that shown in FIG. 12, the maximum rotational speed of the engine 3 is set to the second rotational speed (approximately 8,000 rpm) even though the water level sensor 40 does not output the water detection signal. An adequate propulsive force is thereby obtained and the water jet propulsion watercraft 1 can be moved into water.

If the bucket 10 is at the forward drive position B (if the forward drive switch is ON; step S1: NO in FIG. 11), the ECU 28 determines whether or not the water detection signal from the water level sensor 40 is received (step S2). If the hull 2 is in water, the interior of the housing 18 is filled with water via the cooling water introduction channel 12 and the water introduction channel 21 and the float 19 thus rises to the height position H2. Two lead terminals 20a and 20b of the switch portion 20 are thus put in contact by the permanent magnet 19a attached to the float 19 and electricity flows. The water level sensor 40 thus generates the water detection signal. The ECU 28 determines whether or not this water detection signal is received.

If the water detection signal is received (step S2: YES), the ECU 28 judges that the hull 2 is in water. The ECU 28 then sets the maximum rotational speed of the engine 3 to approximately 8,000 rpm (step S3). An adequate propulsive force can thereby be obtained.

Also, if the water detection signal is not received and the bucket 10 is at the forward drive position B (step S2: NO), the ECU 28 determines that the hull 2 is on land. Further, the ECU 28 sets the maximum rotational speed of the engine 3 to the first rotational speed (for example, approximately 4,000 rpm) (step S4).

The ECU 28 restricts the rotational speed of the engine 3 to not more than the maximum rotational speed set as described above. For example, when the maximum rotational speed is set to the first rotational speed (step S4), the ECU 28 restricts the engine rotational speed to not more than the first rotational speed (step S5). Specifically, until the rotational speed of the engine 3 detected by the engine rotational speed sensor 3e reaches approximately 4,000 rpm, the ECU 28 drives the throttle valve actuator 3b based on the detection result of the accelerator position sensor 27. An opening of the throttle valve 3a is thereby increased according to an operation amount of the accelerator lever 26c. On the other hand, when the rotational speed of the engine 3 detected by the engine rotational speed sensor 3e exceeds approximately 4,000 rpm, the ECU 28 executes a different control. That is, the ECU 28 controls the throttle valve actuator 3b so as not to increase the opening of the throttle valve 3a regardless of the detection result of the accelerator position sensor 27. The rotational speed of the engine 3 is thereby prevented from entering an excessive rotational state (a rotational speed greater than approximately 4,000 rpm) even when the accelerator lever 26c is operated excessively when performing racing on land.

As described above, the preferred embodiment is preferably provided with the water detection unit 17 that detects that the hull 2 is immersed in water at least to a predetermined height position (that there is water around the hull 2). The water detection unit 17 is arranged to directly detect the existence of water around the hull 2. Whether or not the hull 2 is immersed in water up to the predetermined height position (whether or not the hull 2 is in water or on land) can thus be determined based on the output signal of the water detection unit 17 (to be accurate, the output signal of the water level sensor 40). When the hull 2 is on land, there is no water around the hull 2. The water detection unit 17 thus does not detect water. The hull 2 is on land can thereby be determined immediately at the point in time at which the water detection unit 17 no longer detects water, and there is no need to wait for elapse of a predetermined time. Also, when it is determined that the hull 2 is not in water (is on land), the maximum rotational speed of the engine 3 is set to approximately 4,000 rpm to reliably restrict the rotational speed of the engine 3 to not more than approximately 4,000 rpm when performing racing on land. Thus, problems due to the rotational speed of the engine 3 rising too high when performing racing on land can be reliably prevented. That is, increase of load on the engine 3 and generation of an excessively loud noise as exhaust noise of the engine 3 during high speed rotation can be prevented.

Further, in the present preferred embodiment, the water detection unit 17 is preferably disposed inside the hull 2, and water is preferably introduced to the water detection unit 17 from the exterior of the hull 2 via the cooling water introduction channel 12 and the water introduction channel 21 as described above. By this arrangement, when there is water around the hull 2, the water can be detected by the water detection unit 17 disposed inside the hull 2. Thus, unlike in a case where the water detection unit 17 is disposed at the outer side of the hull 2, the water detection unit 17 can be prevented from breaking due to the water detection unit 17 hitting an object, etc. Further, with the water jet propulsion watercraft 1, although pressure applied to the outer side of the hull 2 is large in variation width, influence due to the variation of the pressure applied to the water detection unit 17 can be made small by disposing the water detection unit 17 inside the hull 2. Durability and reliability of the water detection unit 17 can be improved accordingly.

Further, with the present preferred embodiment, the water that has been introduced to the water detection unit 17 is preferably discharged to the exterior in the transition from the state in which the hull 2 is in water to the state in which the hull 2 is not in water as described above. More specifically, the water inside the water detection unit 17 is preferably discharged to the exterior of the hull 2 via the water introduction channel 21 and the cooling water introduction channel 12 (channel portion 12c) that are disposed below the water detection unit 17. By this arrangement, the water introduced to the water detection unit 17 when the hull 2 is in water can be discharged rapidly when the hull 2 is landed. What the hull 2 is on land can thereby be detected reliably.

Further, in the present preferred embodiment, the diameter of the water introduction channel 21 is preferably smaller than the diameter of the housing 18 as described above. The discharge of water from inside the housing 18 can thereby be slowed readily. Thus, even when the introduction port 12a of the cooling water introduction channel 12 is temporarily exposed to air during marine vessel running (planing) on water, water can be held inside the water detection unit 17. Erroneous determination of the hull 2 being on land can thereby be prevented when the introduction port 12a of the cooling water introduction channel 12 is temporarily exposed to air during marine vessel running (planing). The restriction of the rotational speed of the engine 3 to not more than approximately 4,000 rpm, for example, due to the erroneous determination during marine vessel running can thereby be prevented.

Further, in the present preferred embodiment, the water introduction channel 21 of the water detection unit 17 is preferably branched from the cooling water introduction channel 12 that introduces the cooling water to the engine 3 as described above. By this arrangement, simplification of structure can be achieved in comparison to an arrangement where water is directly introduced from the exterior of the hull 2 to the water introduction channel 21 of the water detection unit 17. Also, the water at the exterior of the hull 2 can be introduced reliably into the water detection unit 17 because the water that is pressurized by the jet propulsion device 60 is introduced into the water detection unit 17.

Further, in the present preferred embodiment, in the transition from the state where the hull 2 is in water to the state where the hull 2 is not in water, the water introduced to the water detection unit 17 is preferably discharged to the exterior of the hull 2 via the water introduction channel 21 and the cooling water introduction channel 12 (channel portion 12*c*) as described above. By this arrangement, the structure can be simplified because there is no need to provide a separate drain channel in addition to the water introduction channel 21 and the cooling water introduction channel 12.

Also, in the present preferred embodiment, the ventilation port 23 is preferably arranged in the portion of the bilge drain channel 16 that is disposed above the waterline T as described above. By this arrangement, even when the suction port 15 of the bilge drain channel 16 at the inner side of the hull 2 is below the waterline T and the bilge drain channel 16 is filled with water, entry of water due to the siphon phenomenon can be avoided. That is, water at the exterior of the hull 2 can be prevented from flowing in reverse into the hull 2 via the bilge drain channel 16 because the siphon phenomenon can be avoided by the provision of the ventilation port 23. Moreover, leakage of water from the ventilation port 23 can be prevented because the ventilation port 23 is disposed above the waterline T in the state where the hull 2 is anchored.

Also, in the present preferred embodiment, the water level sensor 40 included in the water detection unit 17 preferably includes the float sensor having the float 19 that rises and descends according to the water level as described above. The water level sensor 40 can thereby be made to have a simple structure. Breakage of and erroneous detection by the water level sensor 40 can thus be prevented despite attachment to the water jet propulsion watercraft 1 with which change of posture and vibration during operation occur frequently. The water level sensor 40 can thereby be made to have adequate durability and reliability.

Further, in the present preferred embodiment, the water detection unit 17 is preferably disposed so as to be positioned below the height position of the waterline T in the state where the hull 2 is anchored as described above. By this arrangement, water can be introduced to the water detection unit 17 reliably even in the state where the engine 3 is stopped and the hull 2 is anchored. Whether or not the hull 2 is in water can thereby be determined based on the output single of the water detection unit 17 (water level sensor 40) even in the state where the engine 3 is not driven.

Also, in the present preferred embodiment, the bulkhead 2*d* that partitions the interior of the hull 2 into the front side portion 2*e* and the rear side portion 2*f* is preferably provided as described above. Then, the engine 3 is disposed at the front side portion 2*e*, and the water detection unit 17 is disposed at the rear side portion 2*f*. By this arrangement, the bulkhead 2*d* can prevent the heat of the engine 3 from radiating directly onto the water detection unit 17. The water detection unit 17 is thereby made less likely to be influenced by the heat of the engine 3 and lowering of detection precision of the water detection unit 17 can be prevented.

Also, with the present preferred embodiment, when the hull 2 is determined to be in water, the maximum rotational speed of the engine 3 is preferably set to approximately 8,000 rpm, for example. By this arrangement, operation can be performed by raising the rotational speed of the engine 3 in an ordinary manner at times other than when performing racing on land.

Further, with the present preferred embodiment, as described above, when the bucket 10 is positioned at the reverse drive position A, the maximum rotational speed of the engine 3 is preferably set to approximately 8,000 rpm, for example, regardless of the signal from the water detection unit 17 (water level sensor 40). By this arrangement, convenience in setting the water jet propulsion watercraft 1 in water from land can be improved. Specifically, there is a case where the bucket 10 is positioned at the reverse drive position A with the jet propulsion device 6 being placed in water, and while jetting water forward, the water jet propulsion watercraft 1 is backed into water by the propulsive force. In this process, the rotational speed of the engine 3 can be raised to approximately 8,000 rpm, for example, even if it is judged that the water jet propulsion watercraft 1 is on land based on the signal of the water detection unit 17. Restriction of the propulsive force for setting the hull 2 in water can thereby be prevented. The convenience can thereby be improved.

It is to be understood that the preferred embodiment disclosed herein is by all means illustrative and not restrictive. The scope of the present invention is defined by the claims and not by the preceding description of the preferred embodiments, and all changes that fall within the metes and bounds of the claims or equivalence of such metes and bounds are therefore intended to be embraced by the claims.

For example, with the above-described preferred embodiment, although the water detection unit 17 is preferably provided inside the hull 2, the present invention is not restricted thereto. The water detection unit may be provided at the outer side of the hull instead.

Also, with the above-described preferred embodiment, water is preferably introduced into the water detection unit 17 via the water introduction channel 21 that is branched from the cooling water introduction channel 12. However, the present invention is not restricted thereto, and a cooling water introduction channel and a water introduction channel arranged to introduce water into the water detection unit 17 may be provided separately.

Also, with the above-described preferred embodiment, although the channel portion 12*c* of the cooling water introduction channel 12 and the water introduction channel 21 preferably correspond to the "drain channel" according to a preferred embodiment of the present invention, the present invention is not restricted thereto. That is, as indicated by phantom lines in FIG. 5, a drain channel 50 may be provided apart from the channel portion 12*c* of the cooling water introduction channel 12 and the water introduction channel 21.

Also, as indicated by phantom lines in FIG. 2, a dedicated water introduction and drain channel 45, which is independent of the cooling water introduction channel 12, may be provided. In this example, a lower end of the water introduction and drain channel 45 opens to the hull bottom at the rear relative to an opening position of the water suction portion 2*g*. An upper end of the water introduction and drain channel 45 is connected to a bottom portion of a water detection unit 17A. An overflow drain channel 46 is connected to an upper portion of the water detection unit 17A. The overflow drain channel 46 is joined to the bilge drain channel 16 at a position higher than the waterline T during anchoring. By this arrangement, when the hull 2 is in water, the water around the hull 2 is introduced into the water detection unit 17A through the water introduction and drain channel 45. When the hull 2 is landed from water, the water inside the water detection unit 17A is discharged out of the hull through the water introduction and drain channel 45. The water detection unit 17A may have the same arrangement as the water detection unit 17 described above.

Also, with the above-described preferred embodiment, although the diameter of the water introduction channel 21 is preferably made smaller than the diameter of the housing 18 to slow the discharge rate of the water inside the housing 18, the present invention is not restricted thereto. For example, a valve mechanism that narrows the flow path cross-sectional area of the water introduction passage 21 when water is discharged from the housing 18 via the water introduction channel 21 may be provided. In this case, the valve mechanism is an example of a "drain slowing unit" according to a preferred embodiment of the present invention.

Also, with the above-described preferred embodiment, although the water detection unit 17 is preferably disposed below the waterline T, the present invention is not restricted thereto, and the water detection unit 17 may instead be disposed above the waterline T.

Also, with the above-described preferred embodiment, if it is judged that the hull 2 is not in water, control is performed to keep the rotational speed of the engine 3 at not more than approximately 4,000 rpm, for example, by not allowing the opening of the throttle valve 3a to increase. Therefore, the present invention is not restricted to such an arrangement. For example, to restrict the engine rotational speed, the fuel injection by the fuel injection system 3c may be stopped temporarily or intermittently, or the ignition by the ignition system 3d may be stopped temporarily or intermittently.

Also, with the above-described preferred embodiment, although the water detection unit 17 is preferably turned OFF when the hull 2 is not in water and the water detection unit 17 is turned ON when the hull 2 is in water, the present invention is not restricted thereto. That is, the water detection unit may instead be arranged such that the water detection unit 17 is turned ON when the hull 2 is not in water and the water detection unit 17 is turned OFF when the hull 2 is in water.

Also, with the above-described preferred embodiment, although the float sensor having the float 19 is preferably used as the water level sensor 40, the present invention is not restricted thereto. That is, a sensor of another type may be used as long as it is a sensor capable of detecting that the water level inside the housing 18 is not less than a certain level. For example, an ultrasonic wave type sensor or a capacitance type sensor may be used. The ultrasonic wave type sensor may be arranged to that emit ultrasonic waves onto a water surface, and to detect the water level from a time taken until the ultrasonic waves reflected by the water surface are received. The capacitance type sensor may be arranged to detect the water level by making use of a difference in capacitance of air and water.

Also, with the above-described preferred embodiment, although the ECU 28 is preferably started and the engine 3 is started when the engine starting button is pressed, the present invention is not restricted thereto. That is, the starting of the ECU 28 and the starting of the engine 3 may be performed by separate operations. In this case, even when the engine 3 is not being driven, whether or not the hull 2 is in water can be determined by the water detection unit 17 as long as the ECU 28 is started. By determining whether or not the hull 2 is in water before the engine 3 is started, appropriate rotation speed restriction control can be executed immediately after starting of the engine.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The present application corresponds to Japanese Patent Application No. 2009-034717 filed in the Japan Patent Office on Feb. 18, 2009, and the entire disclosure of the application is incorporated herein by reference.

What is claimed is:

1. A water jet propulsion watercraft comprising:
a hull;
an engine disposed inside the hull;
a jet propulsion device arranged to be driven by a driving force of the engine, and to jet water rearward from a jet port to thereby apply a propulsive force to the hull;
a water detection unit including a water detection chamber arranged such that water around the hull is introduced when the hull is immersed in water, and a water level sensor arranged to detect a water level inside the water detection chamber so as to detect whether or not the hull is immersed in water;
a water channel branching from the jet propulsion device, and arranged to introduce water pressurized by the jet propulsion device into the engine;
a water introduction channel coupled to the water channel and arranged to introduce the water from the water channel into the water detection chamber; and
a control unit arranged to judge whether or not the hull is in water based on an output signal of the water level sensor, to set a maximum rotational speed of the engine to a first rotational speed, and to restrict the rotational speed of the engine to not more than the maximum rotational speed when the hull is not in water.

2. The water jet propulsion watercraft according to claim 1, wherein the water detection chamber is disposed inside the hull.

3. The water jet propulsion watercraft according to claim 1, wherein the water jet propulsion watercraft is arranged such that the water in the water detection chamber is discharged to an exterior of the hull via a drain channel during a transition from a state in which the hull is in water to a state in which the hull is not in water, and the drain channel is disposed below the water detection chamber.

4. The water jet propulsion watercraft according to claim 3, wherein a drain slowing unit arranged to slow a drain rate of the water drained from the water detection chamber is provided in the drain channel.

5. The water jet propulsion watercraft according to claim 4, wherein the drain channel is connected to the water detection chamber, and the water drain slowing unit includes piping having a smaller flow path cross-sectional area than a horizontal cross-sectional area of the water detection chamber.

6. The water jet propulsion watercraft according to claim 1, wherein the water channel is a cooling water introduction channel arranged to introduce water pressurized by the jet propulsion device as cooling water into the engine, and the water introduction channel branches from the cooling water introduction channel.

7. The water jet propulsion watercraft according to claim 3, further comprising an overflow drain channel arranged to cause water inside the water detection chamber to overflow and be discharged to the exterior of the hull when the hull is in water.

8. The water jet propulsion watercraft according to claim 7, wherein at least a portion of the overflow drain channel is disposed above a waterline of the hull.

9. The water jet propulsion watercraft according to claim 7, further comprising a bilge drain channel arranged to discharge water retained inside the hull to the exterior of the hull, wherein the overflow drain channel is joined to the bilge drain channel.

10. The water jet propulsion watercraft according to claim 9, wherein at least a portion of the bilge drain channel is disposed above a waterline of the hull, and a ventilation port is arranged at a portion of the bilge drain channel disposed above the waterline.

11. The water jet propulsion watercraft according to claim 1, wherein the water level sensor includes a float sensor having a float that is arranged to rise and descend according to the water level inside the water detection chamber.

12. The water jet propulsion watercraft according to claim 1, wherein the water detection chamber is positioned below a height position of the waterline of the hull.

13. The water jet propulsion watercraft according to claim 1, wherein a partition plate arranged to partition an interior of the hull into a front portion and a rear portion is provided inside the hull, the engine is disposed at the front portion of the hull, and the water detection unit is disposed at the rear portion of the hull.

14. The water jet propulsion watercraft according to claim 1, wherein the control unit is arranged to judge whether or not the hull is in water based on a signal from the water level sensor and to set the maximum rotational speed of the engine to a second rotational speed greater than the first rotational speed when the hull is in water.

15. The water jet propulsion watercraft according to claim 14, further comprising an inverting member arranged to enable movement between a forward drive position of not blocking the water jetted from the jet port of the water jet propulsion device and a reverse drive position of blocking the water jetted from the jet port, the inverting member being arranged to convert a jetting direction of the water, jetted rearward from the jet port, to a forward direction when the inverting member is at the reverse drive position, wherein the control unit is arranged to set the maximum rotational speed of the engine to the second rotational speed regardless of the signal from the water level sensor when the inverting member is at the reverse drive position.

16. A water jet propulsion watercraft comprising:
a hull;
an engine disposed inside the hull;
a jet propulsion device arranged to be driven by a driving force of the engine, and to jet water rearward from a jet port to thereby apply a propulsive force to the hull;
a water detection unit including a water detection chamber, disposed inside the hull, arranged such that water around the hull is introduced when the hull is immersed in water, and a water level sensor arranged to detect a water level inside the water detection chamber so as to detect whether or not the hull is immersed in water;
a water introduction channel arranged to introduce the water around the hull from an exterior of the hull into the water detection chamber; and
a control unit arranged to judge whether or not the hull is in water based on an output signal of the water level sensor, to set a maximum rotational speed of the engine to a first rotational speed that is less than an upper limit rotational speed, and to restrict the rotational speed of the engine to not more than the maximum rotational speed when the hull is not in water, wherein
the water jet propulsion watercraft is arranged such that the water in the water detection chamber is discharged to the exterior of the hull via a drain channel during a transition from a state in which the hull is in water to a state in which the hull is not in water, the drain channel is disposed below the water detection chamber, and
a drain slowing unit arranged to slow a drain rate of the water drained from the water detection chamber is provided in the drain channel.

17. The water jet propulsion watercraft according to claim 16, wherein the drain channel is connected to the water detection chamber, and the water drain slowing unit includes piping having a smaller flow path cross-sectional area than a horizontal cross-sectional area of the water detection chamber.

18. A water jet propulsion watercraft comprising:
a hull;
an engine disposed inside the hull;
a jet propulsion device arranged to be driven by a driving force of the engine, and to jet water rearward from a jet port to thereby apply a propulsive force to the hull;
a water detection unit including a water detection chamber, disposed inside the hull, arranged such that water around the hull is introduced when the hull is immersed in water, and a water level sensor arranged to detect a water level inside the water detection chamber so as to detect whether or not the hull is immersed in water;
a water introduction channel arranged to introduce the water around the hull from an exterior of the hull into the water detection chamber;
a cooling water introduction channel arranged to introduce water pressurized by the jet propulsion device as cooling water into the engine; and
a control unit arranged to judge whether or not the hull is in water based on an output signal of the water level sensor, to set a maximum rotational speed of the engine to a first rotational speed that is less than an upper limit rotational speed, and to restrict the rotational speed of the engine to not more than the maximum rotational speed when the hull is not in water, wherein
the water jet propulsion watercraft is arranged such that the water in the water detection chamber is discharged to the exterior of the hull via a drain channel during a transition from a state in which the hull is in water to a state in which the hull is not in water, the drain channel is disposed below the water detection chamber, and
the water introduction channel branches from the cooling water introduction channel.

19. The water jet propulsion watercraft according to claim 18, wherein the drain channel includes a portion of the water introduction channel and the cooling water introduction channel.

20. A water jet propulsion watercraft comprising:
a hull;
an engine disposed inside the hull;
a jet propulsion device arranged to be driven by a driving force of the engine, and to jet water rearward from a jet port to thereby apply a propulsive force to the hull;
a water detection unit including a water detection chamber, disposed inside the hull, arranged such that water around the hull is introduced when the hull is immersed in water, and a water level sensor arranged to detect a water level inside the water detection chamber so as to detect whether or not the hull is immersed in water;
a water introduction channel arranged to introduce the water around the hull from an exterior of the hull into the water detection chamber;
an overflow drain channel arranged to cause excess water inside the water detection chamber to overflow and be discharged to the exterior of the hull when the hull is in water;

a bilge drain channel arranged to discharge water retained inside the hull to the exterior of the hull; and a control unit arranged to judge whether or not the hull is in water based on an output signal of the water level sensor, to set a maximum rotational speed of the engine to a first rotational speed that is less than an upper limit rotational speed, and to restrict the rotational speed of the engine to not more than the maximum rotational speed when the hull is not in water, wherein the water jet propulsion watercraft is arranged such that the water in the water detection chamber is discharged to the exterior of the hull via a drain channel during a transition from a state in which the hull is in water to a state in which the hull is not in water, the drain channel is disposed below the water detection chamber, and the overflow drain channel is joined to the bilge drain channel.

21. The water jet propulsion watercraft according to claim 20, wherein at least a portion of the bilge drain channel is disposed above the waterline in the state where the hull is anchored in the water, and a ventilation port is arranged at a portion of the bilge drain channel disposed above the waterline.

* * * * *